United States Patent [19]

Hellgren

[11] Patent Number: 4,658,618

[45] Date of Patent: Apr. 21, 1987

[54] FORMING PRESS OF THE PRESSURE CELL TYPE

[75] Inventor: Keijo Hellgren, Västerås, Sweden

[73] Assignee: ASEA Aktiebolag, Västerås, Sweden

[21] Appl. No.: 823,326

[22] Filed: Jan. 28, 1986

[30] Foreign Application Priority Data

Feb. 6, 1985 [SE] Sweden ................................ 8500544

[51] Int. Cl.[4] ............................................ B29C 17/04

[52] U.S. Cl. ........................................ 72/63; 72/60; 72/54; 425/389; 425/DIG. 112; 425/405 R

[58] Field of Search ................ 72/54, 56, 60, 63, 709; 29/421 R; 425/389, 405 R, 394, DIG. 19, DIG. 112

[56] References Cited

U.S. PATENT DOCUMENTS 3,396,561 8/1968 Day ........................................ 72/63
3,463,035 8/1969 Bright .................................... 72/54
4,080,139 3/1978 Hellgren ................................ 72/63
4,105,388 8/1978 Hellgren ...................... 425/DIG. 19

FOREIGN PATENT DOCUMENTS 664719 5/1979 U.S.S.R. ................................ 72/54

*Primary Examiner*—Robert L. Spruill
*Assistant Examiner*—David B. Jones
*Attorney, Agent, or Firm*—Watson, Cole, Grindle & Watson

[57] ABSTRACT

A press comprising a press stand, a pressure cell arranged in the press stand with an elastic diaphragm and a tray-shaped tool-carrying member, insertable into the press, in which a forming tool and a workpiece are located. In the inserted position of the tool-carrying member in the press, a closed working space is formed between the pressure cell and the tool-carrying member. The diaphragm is placed in a recess in a press plate. The seal between the diaphragm and the press plate consists of a U-shaped sealing ring having flanges directed inwards towards the center of the pressure cell.

9 Claims, 8 Drawing Figures

FORMING PRESS OF THE PRESSURE CELL TYPE

TECHNICAL FIELD

The present invention relates to a pressure cell type forming press. Presses of this kind are used to a large extent for shaping complicated sheet metal parts, for example, in the aircraft industry. A great advantage of this type of forming press is that it can be provided with a very large working surface thus enabling large sheet metal parts to be formed in a single pressing operation.

DISCUSSION OF PRIOR ART

The characteristic feature of a pressure cell type forming press is that it comprises a pressure cell with an elastic diaphragm which directly, but usually via a thick wear-resistant forming pad, exerts a compressive force against a workpiece sheet on a forming tool in a closed space below the diaphragm. The pressure cell, with the forming pad is arranged in a trough- or tray-shaped press plate which is attached to an upper force-absorbing member in a press having the recess of the press plate facing downwards. The forming tool is placed in a recess in a trough- or tray-shaped displaceable carrying member which, after insertion into the press, forms a closed press space together with the press plate and its diaphragm. Owing to the high working pressure used, 100 MPa and thereabove, and the considerable stretching of the diaphragm that occurs, considerable problems with strength and sealing exist. The material problems are substantial and the tool costs are high because of the size and shape of the diaphragm. This has, among other things, resulted in a limitation of the choice of materials for the diaphragm. The use of materials which are most suitable from the elastic point of view, such as crude or natural rubber, requires very expensive vulcanizing tools, having regard both to the size of the diaphragm and the shape of the attachment part thereof. For these reasons it has been necessary to resort to the use of materials which are capable of being cast to shape, for example polyurethane, since these permit diaphragms to be manufactured at moderate cost. Replacement of worn diaphragms of the present design is time-consuming, which is a disadvantage.

Presses of the kind mentioned above to which the invention relates are disclosed in greater detail, in, inter alia, Hellgren's U.S. Pat. No. 3,875,778, Claesson et al's U.S. Pat. No. 3,938,361 and Syväkari's U.S. Pat. No. 3,949,583 as well as in a Pamphlet AQ 30-103E published by ASEA AB of Västerås, Sweden.

OBJECTS OF THE INVENTION

One object of the invention is to provide a diaphragm for a pressure cell type forming press which is simpler to manufacture. A further object is to provide a simplified attachment means of the diaphragm which permits a simpler and faster replacement of a damaged diaphragm.

SUMMARY OF THE INVENTION

According to the invention, the diaphragm lacks the previous inwardly-facing attachment flange, which resulted in the above-mentioned difficulties in manufacture and the undesired limitation of the material choice or the high manufacturing costs. Instead, the diaphragm is substantially made plane. This means that the diaphragm can be manufactured from a material such as crude rubber, which has the best elastic properties from the sealing point of view, since the necessary vulcanizing tools no longer involve prohibitively high costs. The seal against the press plate, which together with the diaphragm forms the pressure cell, desirably consists of a U-shaped sealing ring. The diaphragm and the sealing ring can be simply lifted up towards the press plate and places in the recess therein and can then be held in position by means of longitudinal side bars and transverse vertically movable beams which seal against the end surfaces of a tool tray and prevent the diaphragm (or forming pad connected to the diaphragm) being extruded from the press during a forming operation.

The diaphragm can be constructed in many different ways. A thick diaphragm consisting of one single material can be used. However, it is usually more convenient to construct the diaphragm from several different layers with different materials in the different layers. A combination of two rubber qualitites is then feasible. Another possibility is to construct the diaphragm with one inner layer of crude rubber and one outer layer of nitrile rubber or polyurethane which forms the forming pad influencing the workpiece sheet to be shaped. Other combinations of materials are also feasible.

The sealing ring is suitably made U-shaped to have a web and two flanges and is placed with its opening between the flanges facing inwards towards the liquid space of the pressure cell. To obtain abutment and initial sealing when pressurizing the pressure cell, the sealing ring can be constructed so that the flanges are urged resiliently outwards so as to obtain good contact with the underside of the press plate and with the upper side of the diaphragm. Furthermore, the sealing ring is suitably made with slots to accommodate soft O-rings to additionally secure initial sealing.

To achieve a reliable and adequate seal between the flanges of a U-shaped sealing ring and the surrounding parts, springs can be placed inside the sealing ring, which springs urge the flanges of the ring away from each other. The springs suitably consist of leaf springs with a small axial extension and these can be connected together by means of inner and/or outer connecting layers to form continuous elongated spring units. A number of springs are suitably cast together between rubber or plastics facing sheets. The sealing ring and the spring elements are desirably located so that they straddle the periphery of a plate or frame, which bestows dimensional stability upon the sealing ring so that it can be handled in a simple manner when the diaphragm is installed in the press.

BRIEF DESCRIPTION OF THE DRAWINGS

The invention will now be described in greater detail, by way of example, with reference to the accompanying drawings, wherein FIG. 1 schematically shows a side view of a press plant.

DESCRIPTION OF PREFERRED EMBODIMENT

Figure 1:
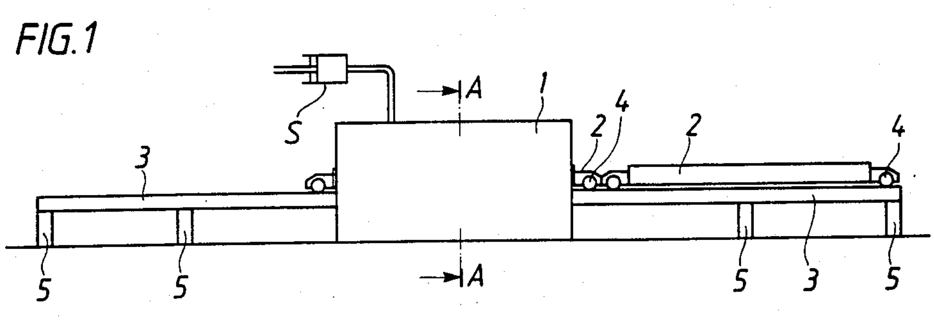

In the Figures, 1 designates a press stand and 2 a pair of tray-shaped carrying members, in each of which forming tools and workpieces to be formed are placed. Each carrying member 2 is provided with transport wheels 4 running on rails 3 supported on columns 5. Each tray 2 is displaceable between a position outside the press stand 1, in which press workpieces are removed and new workpieces are placed on the forming tools, and a position inside the press stand 1, in which the tray 2 and the press stand 1 together form a closed press space where the pressing operation is carried out.

Figure 2:
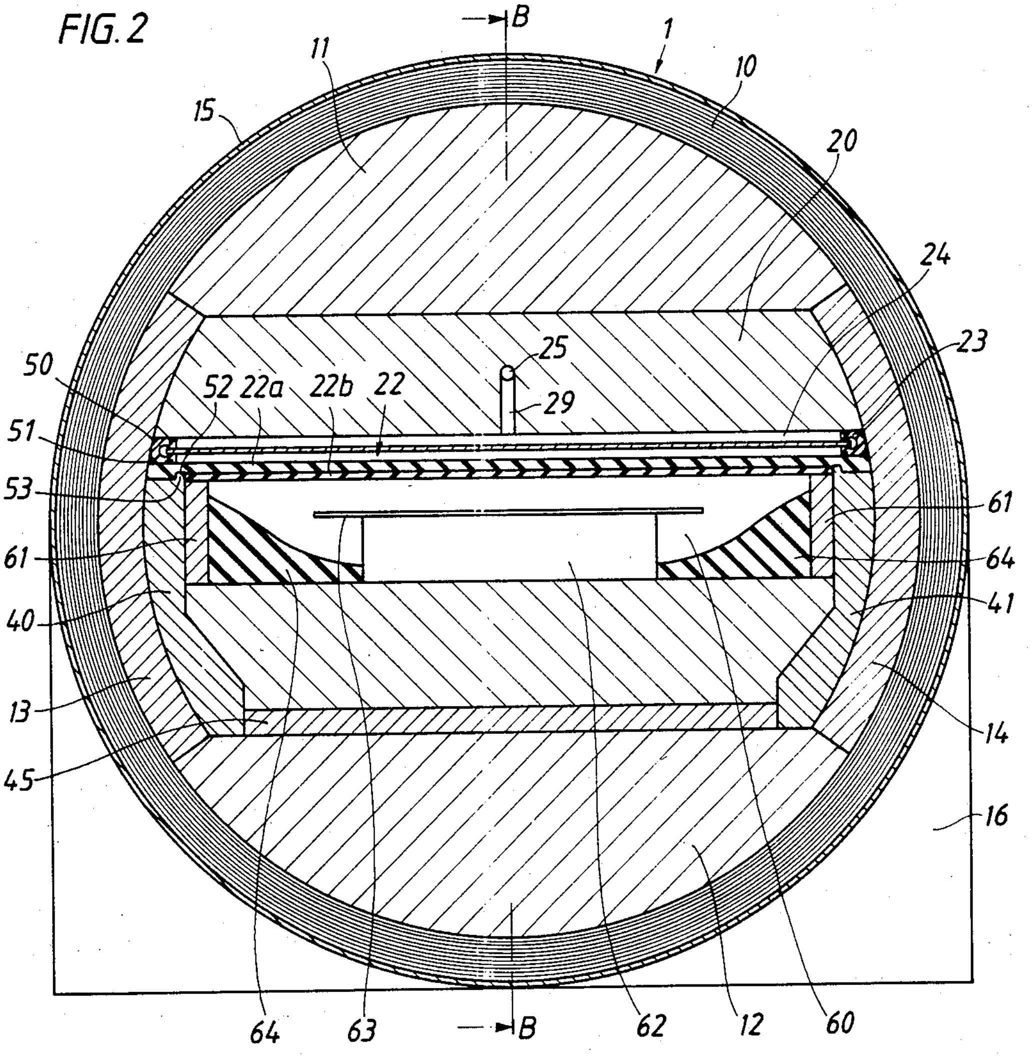
FIG. 2 shows a much enlarged cross-section taken on the line A—A in FIG. 1.

For good pressing results and high accuracy of shape, high pressing pressures are required, particularly in the case of difficultly-shaped sheet material. As is shown in FIG. 2, the press stand 1 is then suitably constructed with a prestress wire-wound mantle 10 which acts as a force-absorbing member. This mantle 10 surrounds an upper yoke 11, a lower yoke 12 and two intermediate spacers 13 and 14, or alternatively a tube. The wire-wound mantle 10 is surrounded by a protective sheet 15. The press stand 1 rests on a support 16. The yokes 11, 12 and the supports 13, 14, or the tube and filling pieces in the form of circular segments positioned in said tube, form a space passing through the press stand 1 and having a substantially rectangular cross-section in a section perpendicular to the transport direction of the carrying members through the press stand 1.

Figure 3:
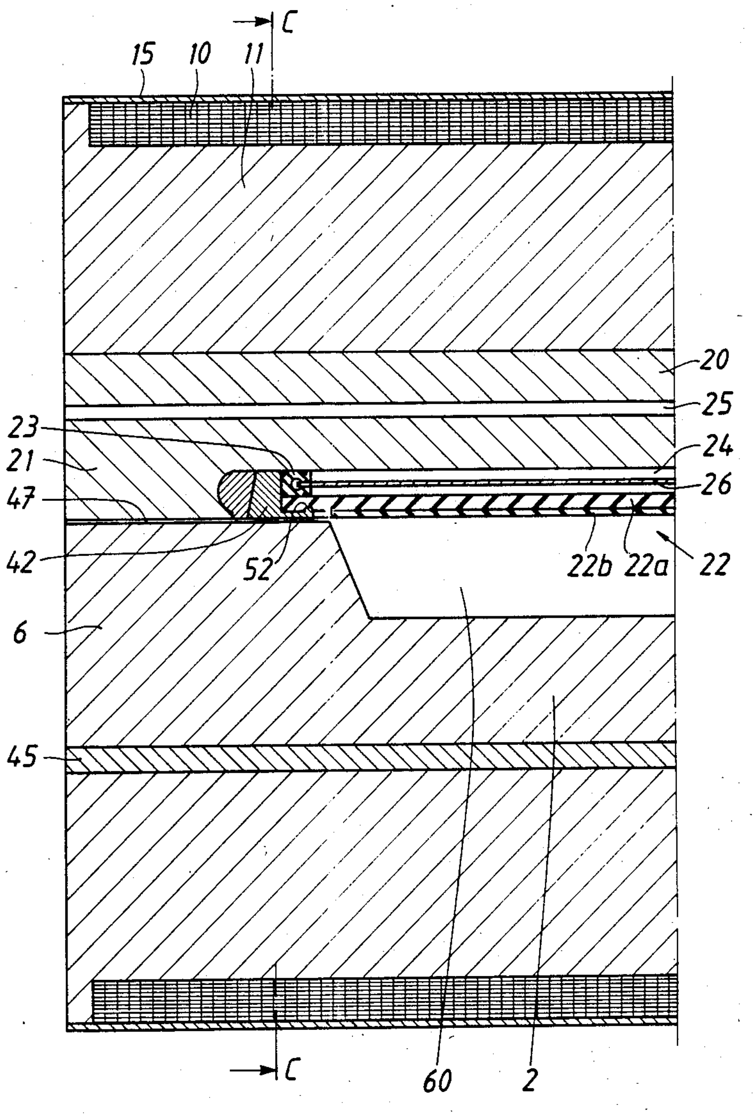
FIG. 3 shows a longitudinal section taken on the line B—B in FIG. 2.
Figure 4:
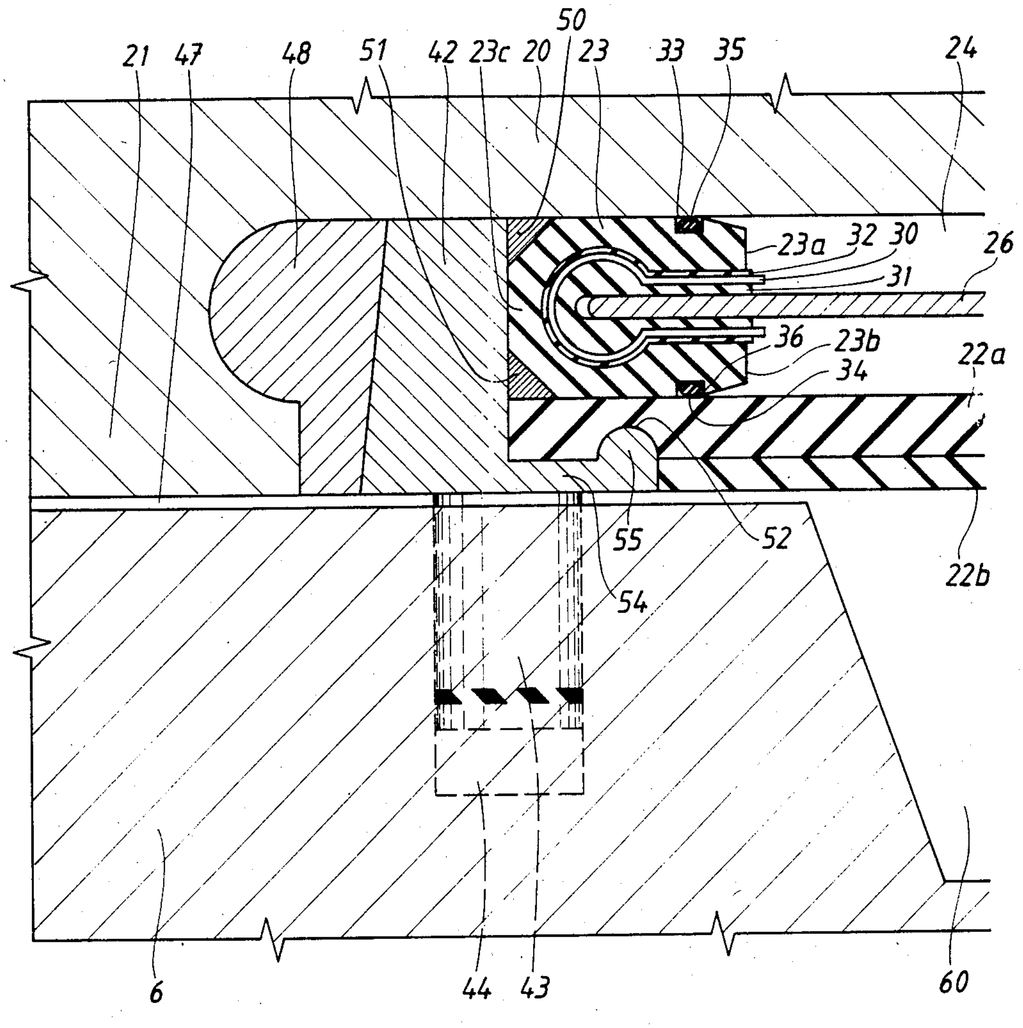
FIG. 4 shows, on a further enlarged scale, part of the section shown in FIG. 3.
Figure 6:
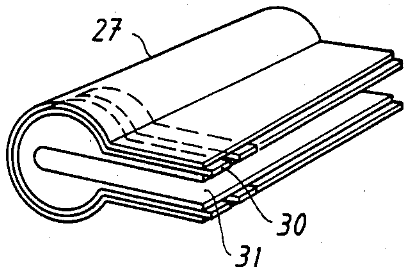
Figure 7:
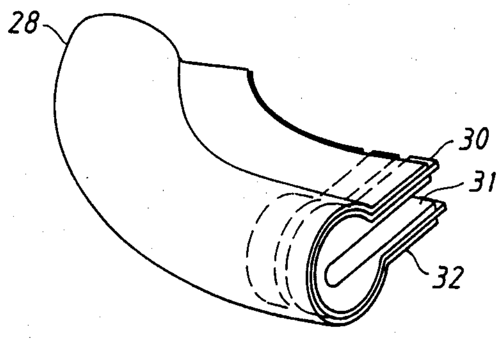
Figure 8:
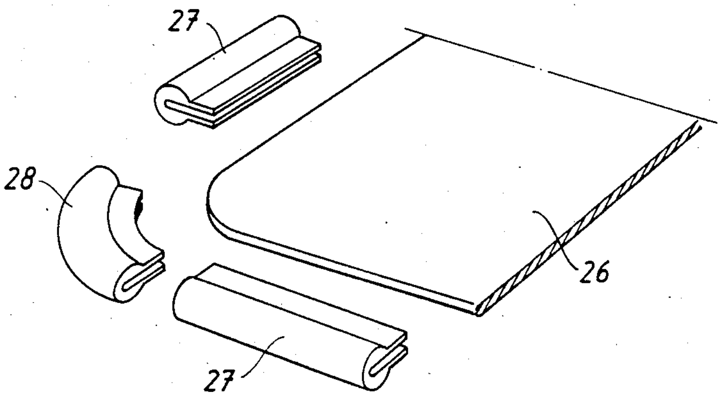
FIG. 8 shows a plate which is straddled by the spring elements and the sealing ring and which gives the sealing ring its required geometrical shape.

The upper part of the space, mentioned in the last paragraph, accommodates a press plate 20 with thickened end wall portions 21 (see FIGS. 3 and 4). This plate 20 is attached to the upper yoke 11 in a manner not shown. In the space between the end wall portions 21, a diaphragm 22 is arranged which is built up of a first layer *22a* and a second layer *22b* united with the first layer. For the layer *22a* a material is chosen which has very good elastic and sealing properties, such as crude natural rubber or synthetic rubber. The hardness is suitably 60° A.–80° A. For the layer *22b* a wear-resistant material is chosen, such as natural rubber, nitrile rubber or polyurethane, which has a hardness that is suitable for the pressing operation (e.g. a hardness of 90° A.). Between the diaphragm 22 and the plate 20, is arranged a sealing ring 23 with a substantially U-shaped cross-section. The plate 20, the diaphragm 22 and the sealing ring 23 form a closed pressure cell 24. The pressure cell 24 is supplied with pressure medium from a pressurised source S (shown schematically in FIG. 1) through channels 25 and 29 in the plate 20. A diaphragm plate 26 extends between legs *23a* and *23b* of the sealing ring 23 and stabilizes the sealing ring. A number of straight and curved spring elements 27 and 28, respectively, are placed in the sealing ring 23 (see FIGS. 6–8). Each spring element 27, 28 consists of a number of U-shaped leaf springs 30 which are faced by an inner layer 31 and an outer layer 32 of a material which holds together a number of individual leaf springs. Each leaf spring has a relatively small axial extension, for example 10–20 mm. The leaf springs 30 can be adhesively secured between the facing layers 31, 32 or they can be cast in between these layers. The material of the layers 31, 32 may be a rubber or plastics material with a suitable elasticity. The spring elements 27, 28 are placed around the periphery of the plate 26, the sealing ring 23 is then pulled over the spring elements 27, 28, and the composite unit formed of the plate 26, the spring elements 27, 28 and the sealing ring 23, is mounted in the press stand 1. The purpose of the spring elements 27, 28 is to enlarge the sealing ring 23 somewhat so as to obtain a contact pressure which is suitable to provide an initial seal against the underside of the plate 20 and against the upper layer *22a* of the diaphragm 22. To ensure a good initial seal when the pressure cell 24 is first pressurized, the flanges *23a* and *23b* of the sealing ring 23 are formed with slots 33, 34, in which are placed O-rings 35, 36 of a soft material which form an efficient seal between the flange *23a* and the plate 20 as well as between the flange *23b* and the diaphragm 22 during the initial pressurization period. Thereafter, the presence of pressure medium between the flanges *23a* and *23b* of the sealing ring 23 will press these flanges with ever increasing force against the plate 20 and the diaphragm 22, respectively, as the pressure in the space is increased.

Figure 5:
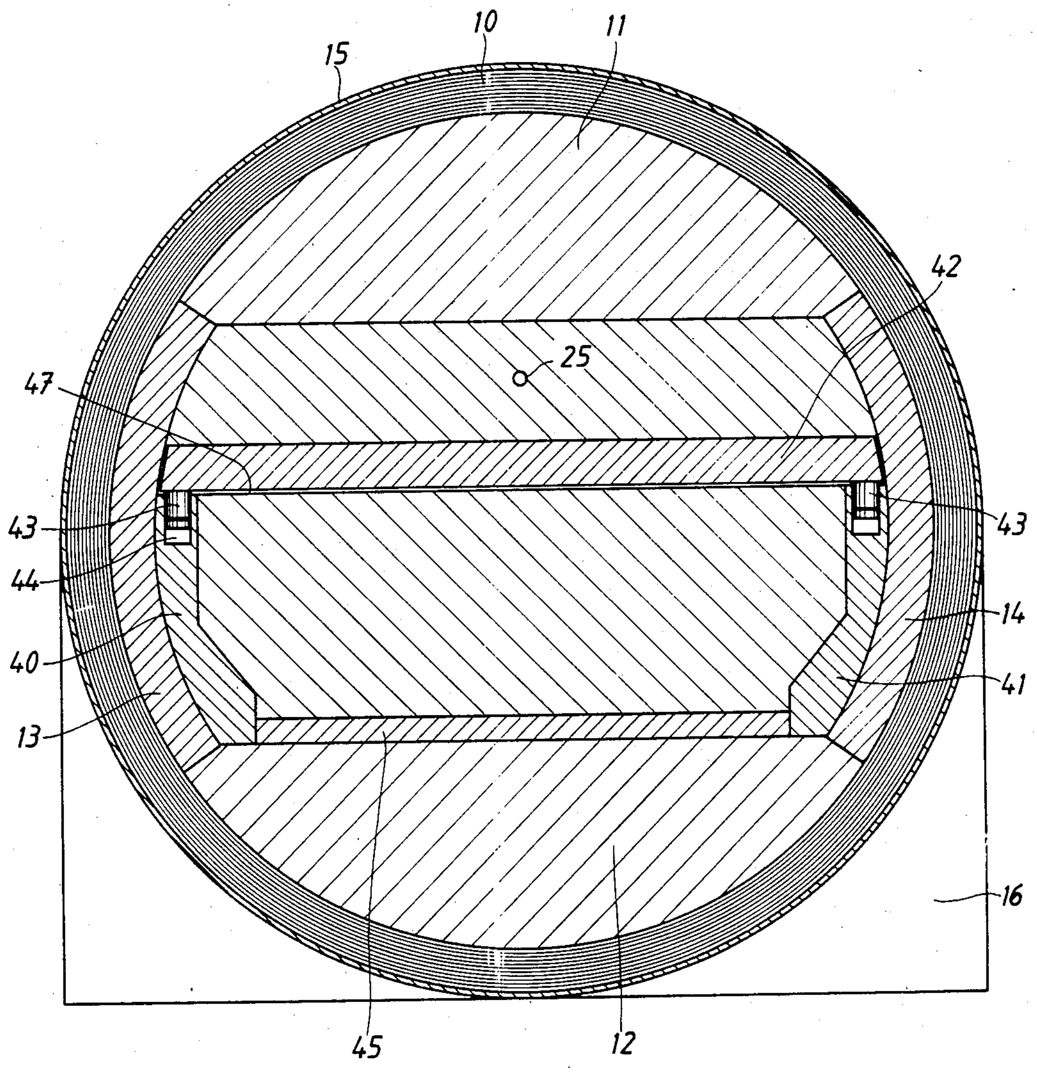
FIG. 5 shows a section on the line C—C in FIG. 3, FIGS. 6 and 7 show straight and curved spring elements which can be used in the sealing ring.

The diaphragm 22 is fixed in the press by means of bars 40 and 41, respectively, along the long sides and by means of beams 42 along the short sides. The bars 40, 41 are fixed in the press by means of a plate 45 resting on the yoke 12. The beams 42 are vertically movably arranged and supported by lifting pistons 43 in cylinders 44 in the bars 40 and 41. During insertion and withdrawal of the tray 2, these pistons 43 hold the beams 42 up in the position shown in FIGS. 3–5, thus forming a gap 47 between the beams 42 and the end portions 6 of the tray 2. With a view to improving strength, the transition between the mid-portion of the plate 20 and its end portions 21 is made with a large radius. It is necessary to locate a special fill-out bar 48 in the plate 20 to permit there to be some vertical movement of the beam 42. During a pressing operation, the beam 42 is pressed against the end portion 6 of the tray 2, thus eliminating the gap 47 and preventing the extrusion of the diaphragm 22 between the end portion 21 of the plate 20 and the end portion 6 of the tray. At the outer corner regions of the sealing ring 23, metallic sections 50 and 51, respectively, of triangular cross-section are located, these sections preventing the sealing ring 23 from being pressed out into the gaps formed between the plate 20 and the spacers 13 and 14 and between the plate 20 and the beam 42, respectively. The gap between the plate 20 and the beam 42 arises when the beam 42 is pressed down against the end portion 6 of the tray 2. As will be clear from FIGS. 3–5, the layer *22a* of the diaphragm 22 is formed with a slot 52 near its periphery. The bars 40, 41 are formed with a bead 53, which projects into this slot 52. The beams 42 are formed with a flange 54 provided with a bead 55, which also projects into the slot 52.

Together with the plate 20 and the diaphragm 22, the tray 2 forms a closed press space 60. The tray 2 is formed with detachable side walls 61 in a known manner. One (or more) forming tool 62 is placed on the bottom of the tray 2, and on this forming tool 62 there is placed one (or more) sheet 63 which is to be formed so as to assume the shape of the forming tool 62. Around the tool 62 there may be located suitable filling pieces 64. During the pressing operation, the pressure cell 24 is pressurized by the supply of pressure medium from the source S. The lower layer *22b* of the diaphragm 22 is thus pressed against the sheet 63 so that this is pressed against the tool 62 and assumes the shape of the tool 62.

The invention may be varied in many ways within the scope of the foregoing claims and all such modifications fall within the scope of the present invention.

I claim:

1. A forming press of the pressure cell type comprising a press stand with two opposing pressure-absorbing elements between which a working space is formed; a press plate, means defining a recess in said press plate, and elastic diaphragm sealingly mounted in the recess to define an expansible pressure cell; a tool carrier member insertable into said working space which, in the inserted position of the tool carrier member, forms a closed press space together with the press plate and the dipahragm; and a pressure medium source for pressurization of the pressure cell for pressing the diaphragm against a workpiece on a forming block in the tool carrier member for forming the workpiece to the desired shape, characterized in that the pressure cell is formed from a substantially plane diaphragm, a substantially plane surface in the press plate, and a sealing ring disposed around the periphery of the diaphragm so as to bridge a gap between the diaphragm and the press plate, the sealing ring having sealing surfaces making contact with the diaphragm and the press plate, the sealing ring being supported by force-absorbing members in the press which are arranged around the periphery of the diaphragm, and the sealing ring having spring elements for pressing the sealing surfaces of the sealing ring against the press plate and the diaphragm, respectively.

2. A forming press of the pressure cell type comprising a press stand with two opposing pressure-absorbing elements between which a working space is formed; a press plate, means defining a recess in said press plate, and elastic diaphragm sealingly mounted in the recess to define an expansible pressure cell; a tool carrier member insertable into said working space which, in the inserted position of the tool carrier member, forms a closed press space together with the press plate and the diaphragm; and a pressure medium source for pressurization of the pressure cell for pressing the diaphragm against a workpiece on a forming block in the tool carrier member for forming the workpiece to the desired shape, characterized in that the pressure cell is formed from a substantially plane diaphragm, a substantially plane surface in the press plate, and a sealing ring disposed around the periphery of the diaphragm so as to bridge a gap between the diaphragm and the press plate, the sealing ring having sealing surfaces making contact with the diaphragm and the press plate, the sealing ring being supported by force-absorbing members in the press which are arranged around the periphery of the diaphragm, the sealing ring being U-shaped so as to define a web and two flanges, and the sealing ring being oriented with its web resting against the surrounding force-absorbing members and with its flanges making contact with the press plate and the diaphragm, respectively.

3. A press according to claim 2, in which spring elements are arrangd inside the sealing ring and urge the flanges of the sealing ring outwards in order to generate an initial contact pressure against the lower surface of the press plate and against the upper surface of the diaphragm, respectively.

4. A press according to claim 3, in which the spring elements consist of a number of individual leaf springs which are combined into a single unit.

5. A press according to claim 4, in which the individual leaf springs are bonded to at least one layer of elastic material.

6. A press according to claim 5, in which the individual leaf springs are bonded to inner and outer facing layers of elastic material.

7. A press according to claim 3, in which a plate is provided in the pressure cell, said plate being surrounded by the spring elements and the sealing ring, thus stabilising the sealing ring.

8. A forming press of the pressure cell type comprising a press stand with two opposing pressure-absorbing elements between which a working space is formed; a press plate, means defining a recess in said press plate, and elastic diaphragm sealingly mounted in the recess to define an expansible pressure cell; a tool carrier member insertable into said working space which, in the inserted position of the tool carrier member, forms a closed press space together with the press plate and the diaphragm; and a pressure medium source for pressurization of the pressure cell for pressing the diaphragm against a workpiece on a forming block in the tool carrier member for forming the workpiece to the desired shape, characterized in that the pressure cell is formed from a substantially plane diaphragm, a substantially plane surface in the press plate, and a sealing ring disposed around the periphery of the diaphragm so as to bridge a gap between the diaphragm and the press plate, the sealing ring having sealing surfaces making contact with the diaphragm and the press plate, the sealing ring being supported by force-absorbing members in the press which are arranged around the periphery of the diaphragm, fixed longitudinal bars for supporting the diaphragm in the press stand along the sides thereof, the bars extending in the transport direction of the tool carrier member, and two transverse vertically movable beams supporting the diaphragm along the sides of the press stand normal to said transport direction.

9. A press according to claim 8, in which the transverse beams rest on pistons in cylinder bores in said longitudinal bars, said pistons being actuable to influence the beams in a direction towards an upper position.

* * * * *